United States Patent [19]

Chenevey et al.

[11] 4,002,426

[45] Jan. 11, 1977

[54] PRODUCTION OF STABILIZED NON-BURNING ACRYLIC FIBERS AND FILMS

[75] Inventors: Edward Clarence Chenevey, North Plainfield; Robert Michael Kimmel, Springfield, both of N.J.

[73] Assignee: Celanese Corporation, New York, N.Y.

[22] Filed: Mar. 5, 1974

[21] Appl. No.: 448,235

Related U.S. Application Data

[63] Continuation of Ser. No. 109,669, Jan. 25, 1971, abandoned.

[52] U.S. Cl. .............................. 8/115.5; 264/29.2; 264/182; 423/447.5
[51] Int. Cl.$^2$ .......................................... C01B 31/07
[58] Field of Search ............... 264/29, 182, 29.2; 423/447, 448, 447.5; 8/115.5

[56] References Cited

UNITED STATES PATENTS

| | | | |
|---|---|---|---|
| 2,560,053 | 7/1951 | Webb | 260/32.6 |
| 2,661,344 | 12/1953 | Slocombe | 260/45.7 |
| 3,416,874 | 12/1968 | Robin | 8/52 |
| 3,523,150 | 8/1970 | Vigneault | 264/182 |
| 3,527,564 | 9/1970 | Moore et al. | 423/447 |
| 3,529,934 | 9/1970 | Shindo | 423/447 |
| 3,556,729 | 1/1971 | Holsten et al. | 423/447 |
| 3,592,595 | 7/1971 | Gump et al. | 423/447 |
| 3,647,770 | 3/1972 | Gump et al. | 260/85.5 |
| 3,656,903 | 4/1972 | Stuetz | 423/447 |
| 3,723,609 | 3/1973 | Mansmann et al. | 423/447 |
| 3,736,309 | 5/1973 | Gump et al. | 264/29 |
| 3,736,310 | 5/1973 | Gump et al. | 260/85.5 |
| 3,846,527 | 11/1974 | Winter et al. | 264/63 |
| 3,850,876 | 11/1974 | DiEdwardo et al. | 264/182 |

Primary Examiner—Jay H. Woo

[57] ABSTRACT

An improved process is provided for the production of stabilized acrylic fibers and films. Certain stabilization promoting agents are incorporated in a solution of an acrylic polymer prior to extruding the same to form a fibrous material or film wherein the pendant nitrile groups present in the acrylic polymer are substantially uncyclized, and the acrylic fibrous material or film having a minor quantity of the stabilization promoting agent incorporated therein is heated in an oxygen-containing atmosphere until a stabilized fibrous material or film is formed which is capable of undergoing carbonization. The stabilization promoting agents employed in the present process are mineral acids, sulfonic acids, certain carboxylic acids, and Lewis acids. The resulting stabilized fibrous material or film is non-burning, and may be utilized as a fire resistant fiber, fabric, or film, or optionally carbonized or carbonized and graphitized to form a carbonaceous fibrous material or film.

18 Claims, No Drawings

PRODUCTION OF STABILIZED NON-BURNING ACRYLIC FIBERS AND FILMS

This is a continuation of application Ser. No. 109,669, filed Jan. 25, 1971 and now abandoned.

BACKGROUND OF THE INVENTION

In the past procedures have been proposed for the conversion of fibers formed from acrylic polymers to a modified form processing enhanced thermal stability. Such modification has generally been accomplished by heating a fibrous material in an oxygen-containing atmosphere at a moderate temperature for an extended period of time.

U.S. Pat. Nos. 2,913,802 to Barnett and 3,285,696 to Tsunoda disclose processes for the conversion of fibers of acrylonitrile homopolymers or copolymers to a heat resistant form. The stabilization of fibers of acrylonitrile homopolymers and copolymers in an oxygen-containing atmosphere involves (1) a chain scission and oxidative crosslinking reaction of adjoining molecules as well as (2) a cyclization reaction of pendant nitrile groups. It is generally recognized that the rate at which the stabilization reaction takes place increases with the temperature of the oxygen-containing atmosphere. However, the stabilization reaction must by necessity be conducted at relatively low temperatures (i.e. below about 300° C.), since the cyclization reaction is exothermic in nature and must be controlled if the original fibrous configuration of the material undergoing stabilization is to be preserved. Accordingly the stabilization reaction tends to be time consuming, and economically demanding because of low productivity necessitated by the excessive time requirements. Prior processes proposed to shorten the period required by the stabilization reaction include that disclosed in U.S. Pat. No. 3,416,874. Additionally, see the processes of commonly assigned United States Ser. Nos. 777,901 (now U.S. Pat. No. 3,592,595)and 777,902 (now U.S. Pat. No. 3,647,770), filed Nov. 21, 1968 of Klaus H. Gump and Dagobert E. Stuetz. See also, our application Ser. No. 109672, Jan. 25, 1971 (now U.S. Pat. No. 3,708,326) filed, entitled "Stabilization of Acrylic Fibers and Films" wherein a previously formed acrylic fibrous material or film is impregnated with a stabilization promoting agent by contact with a solution of the same provided at a moderate temperature, dried to remove the solvent, and heated in an oxygen-containing atmosphere at a more highly elevated temperature until a stabilized fibrous material or film is formed.

While stabilized acrylic fibrous materials may be used directly in applications where a non-burning fiber is required, demands for the same have been increasingly presented by manufacturers of carbonized fibrous materials. Carbonized fibrous materials are commonly formed by heating a stabilized acrylic fibrous material in an inert atmosphere, such as nitrogen or argon, at a more highly elevated temperature. During the carbonization reaction elements such as nitrogen, oxygen, and hydrogen are substantially expelled. Accordingly, the term "carbonized" as used in the art commonly designates a material consisting of at least about 90 percent carbon by weight, and generally at least about 95 percent carbon by weight. Depending upon the conditions under which a carbonized fibrous material is processed, it may or may not contain graphitic carbon as determined by the characteristic x-ray diffraction pattern of graphite. See, for instance, commonly assigned United States Ser. No. 777,275, filed Nov. 20, 1968 (now abandoned) of Charles M. Clarke for a preferred procedure for forming carbonized and graphitized fibrous materials from a stabilized acrylic fibrous material.

It is an object of the invention to provide an improved process for forming thermally stabilized shaped acrylic articles.

It is an object of the invention to provide an improved process for forming flame-proofed fibrous materials or films derived from acrylic polymers.

It is an object of the invention to provide a process wherein the thermal stabilization of an acrylic fibrous material or film is accelerated.

It is another object of the invention to provide an improved process for forming stabilized fibrous materials or films derived from acrylic polymers which results in a product which is suitable for carbonization, or carbonization and graphitization.

These and other objects, as well as the scope, nature, and utilization of the invention will be apparent from the following detailed description and appended claims.

SUMMARY OF THE INVENTION

It has been found that a process for the production of stabilized acrylic fibers and films which are capable of undergoing carbonization comprises:

a. providing a solution of (1) an acrylic polymer selected from the group consisting of an acrylonitrile homopolymer and acrylonitrile copolymers containing at least about 85 mol percent of acrylonitrile units and up to about 15 mol percent of one or more monovinyl units copolymerized therewith wherein the pendant nitrile groups present in said acrylic polymer are substantially uncyclized, (2) a minor quantity of stabilization promoting agent selected from the group consisting of hydrochloric acid, phosphoric acid, nitric acid, methane sulfonic acid, an aromatic sulfonic acid, a carboxylic acid having a $pK_A$ value below about 4.5, and a Lewis acid, and (3) a solvent for said acrylic polymer and said stabilization promoting agent, b. extruding the solution through a shaped orifice to form an acrylic fibrous material or film wherein the pendant nitrile groups present in the acrylic polymer are substantially uncyclized having incorporated therein a minor quantity of the stabilization promoting agent, and c. heating the acrylic fibrous material or film having a minor quantity of the stabilization promoting agent incorporated therein in an oxygen-containing atmosphere at a temperature of about 200 to 350° C. until a thermally stabilized fibrous material or film is formed which is non-burning when subjected to an ordinary match flame and which is capable of undergoing carbonization.

DESCRIPTION OF PREFERRED EMBODIMENTS

The acrylic polymer utilized as the starting material is formed primarily of recurring acrylonitrile units. For instance, the acrylic polymer should generally contain not less than about 85 mol percent of acrylonitrile units and not more than about 15 mol percent of units derived from a monovinyl compound which is copolymerizable with acrylonitrile such as styrene, methyl acrylate, methyl methacrylate, vinyl acetate, vinyl chloride, vinylidene chloride, vinyl pyridine, and the like, or a plurality of such monomers. The pendant nitrile groups present within the acrylic precursor are essentially uncyclized.

The preferred acrylic precursor is an acrylonitrile homopolymer. Preferred acrylonitrile copolymers contain at least about 95 mol percent of acrylonitrile units and up to about 5 mol percent of one or more monovinyl units copolymerized therewith.

Suitable mineral acid stabilization promoting agents are hydrochloric acid, phosphoric acid, sulfuric acid, and nitric acid. The preferred mineral acid for use in the process is orthophosphoric acid.

Suitable sulfonic acid stabilization promoting agents are methane sulfonic acid and the aromatic sulfonic acids. Representative aromatic sulfonic acids include: o-toluene sulfonic acid, m-toluene sulfonic acid, p-toluene sulfonic acid, 2,4-xylene sulfonic acid, benzene sulfonic acid, m-nitrobenzene sulfonic acid, m-benzene disulfonic acid, toluene-2,4-disulfonic acid, p-chlorobenzene sulfonic acid, 2-naphthalenesulfonic acid, etc. The preferred aromatic sulfonic acid for use in the process is p-toluene sulfonic acid.

Suitable carboxylic acid stabilization promoting agents are those carboxylic acids having a $pK_A$ value below about 4.5. Such $pK_A$ values may be conventionally ascertained by determining the negative logarithm of the $K_A$ for a given carboxylic acid in a 0.1M aqueous solution at 25° C. Those carboxylic acids possessing a $pK_A$ above about 4.5 (e.g. acetic acid) have been found to possess insufficient strength to promote the stabilization reaction to any significant degree. The carboxylic acids may be monobasic or dibasic. Representative carboxylic acids for use in the process include: formic acid, chloroacetic acid, dichloroacetic acid, trichloroacetic acid, bromoacetic acid, fluoroacetic acid, trifluoroacetic acid, alpha-chlorobutyric acid, beta-chlorobutyric acid, methoxyacetic acid, vinylacetic acid, oxalic acid, malonic acid, succinic acid, glutaric acid, benzoic acid, o-nitrobenzoic acid, phenylacetic acid, etc. The preferred carboxylic acid for use in the process is formic acid.

Suitable Lewis acid stabilization promoting agents for use in the process of the invention include stannous chloride ($SnCl_2$), stannic chloride ($SnCl_4$), boron fluoride ($BF_3$), sulfur trioxide ($SO_3$), ferric chloride ($FeCl_3$), titanium tetrachloric ($TiCl_4$), aluminum chloride ($AlCl_3$), and indium dichloride ($InCl_2$). The preferred Lewis acid for use in the process is stannic chloride. The high present cost of indium dichloride militates against its selection.

Suitable solvents which may be utilized in the present process are capable of dissolving both the acrylic polymer and the stabilization promoting agent. Representative organic solvents include N,N-dimethylformamide, N,N-dimethylacetamide, dimethyl sulfoxide, butyrolactone, and N-methyl-2-pyrrolidinone. The preferred solvents are those which are commonly utilized during the spinning of fibers from acrylonitrile homopolymers and copolymers. The particularly preferred solvents are N,N-dimethylformamide and N,N-dimethylacetamide. When the stabilization promoting agent is a Lewis acid, the solvent must be essentially anhydrous to avoid gradual deactivation of the same by hydrolysis. The solvent may be dried by running through a bed of drying agent (e.g. Linde sieves, activated alumina, etc.), and moisture excluded by blanketing with dry air or nitrogen.

The concentration of the acrylic polymer in the solvent may be varied widely, e.g. about 5 to about 30 percent by weight based upon the weight of the solvent. Preferred concentrations range from 10 to 25 percent acrylic polymer by weight based upon the weight of the solvent.

The stabilization promoting agent is present in the solution of acrylic polymer in a minor concentration, i.e. about 0.5 to 20 percent by weight based upon the weight of the acrylic polymer. In a preferred embodiment of the process the stabilization promoting agent is present in a concentration of about 1 to 10 percent by weight based upon the weight of the acrylic polymer.

In a preferred embodiment of the process the solution of acrylic polymer and stabilization promoting agent additionally contains 0.1 to 5.0 percent by weight based upon the total weight of the solution (0.5 to 2.0 percent in a particularly preferred embodiment) of lithium chloride dissolved therein. The incorporation of lithium chloride serves the function of lowering and preserving upon standing the viscosity of the solution. The desired solution fluidity and mobility for spinning or casting are accordingly efficiently maintained even upon the passage of time.

The solution of the acrylic polymer and stabilization promoting agent suitable for extrusion may be formed by any convenient technique. For instance, the acrylic polymer while in particulate form together with stabilization promoting agent may be added to the solvent with stirring while maintained at about 50° to 90° C. It is recommended that any heating of the solution in excess of about 100° C. be of limited duration, i.e. no more than a few minutes, so that no substantial degree of cyclization of pendant nitrile groups within the acrylic polymer occurs while dissolved in the solvent.

The solvent is preferably filtered such as by passage through a plate and frame press provided with an appropriate filtration medium, prior to extrusion in order to assure the removal of any extraneous solid matter which could possibly obstruct the extrusion orifice.

The solution containing the acrylic polymer and the stabilization promoting agent is extruded through a shaped orifice to form fibers or films by conventional solution spinning techniques (i.e. may be dry spun or wet spun). As is known in the art, dry spinning is commonly conducted by passing the solution through an opening of predetermined shape into an evaporative atmosphere (e.g. nitrogen) in which much of the solvent is evaporated. Wet spinning is commonly conducted by passing the solution through an opening of predetermined shape into a suitable coagulation bath.

When wet spinning is utilized in the fiber or film forming step of the process, a coagulation bath is selected which is capable of preserving the requisite catalytic quantity of the stabilization promoting agent within the resulting fibrous material or film. More specifically, the bath preferably exhibits no propensity to leach out and dissolve the stabilization promoting agent below the minimum level required for catalysis during the subsequent heat treatment step (described hereafter). Such coagulation bath may inherently possess no substantial tendency to dissolve the stabilization promoting agent. Alternatively, the coagulation bath which is selected may have its inherent tendency to dissolve the stabilization promoting agent diminished by preliminarily dissolving a substantial quantity of the stabilization promoting agent, or other compound therein. When the stabilization promoting agent is a Lewis acid, the coagulation bath should be essentially anhydrous. A preferred wet spinning technique is disclosed in commonly assigned U.S. Ser. No. 28,545, filed Apr. 14, 1970 (now U.S. Pat. No. 3,567,409), which is herein incorporated by reference.

The shaped orifice or spinneret utilized during the extrusion may contain a single hole through which a single filament is extruded, and preferably contains a plurality of holes whereby a plurality of filaments may be simultaneously extruded in yarn form. The spinneret preferably contains holes having a diameter of about 50 to 150 microns when producing relatively low denier fibers having an as-spun denier of about 8 to 24 denier per filament. Alternatively, acrylic films of relatively thin thickness, e.g. about 1 to 10 mils, may be formed, when the extrusion orifice is a rectangular slit.

The resulting as-spun fibrous material or film is preferably maintained in a continuous length configuration throughout the process. At an intermediate point prior to heat treatment the fibrous material may alternatively be transformed into another fibrous assemblage, e.g. a tow, fabric, or yarn of greater total denier.

When the fibrous material is a continuous multifilament yarn, a twist may be imparted to the same to improve the handling characteristics. For instance, a twist of about 0.1 to 5 tpi, and preferably about 0.3 to 1.0 tpi may be utilized. Also a false twist may be used instead of or in addition to a real twist. Alternatively, one may select bundles of fibrous material which possess essentially no twist.

The fibrous material may be drawn in accordance with conventional techniques in order to improve its orientation. For instance, the fibrous material may be drawn by stretching while in contact with a hot shoe at a temperature of about 140° to 160° C. Additional representative drawing techniques are disclosed in U.S. Pat. Nos. 2,455,173; 2,948,581; and 3,122,412. It is recommended that fibrous materials prior to the heat treatment (described hereafter) be drawn to a single filament tenacity of at least about 3 grams per denier. If desired, however, the fibrous material may be more highly oriented, e.g. drawn up to a single filament tenacity of about 7.5 to 8 grams per denier, or more. Additionally, the acrylic films optionally may be either uniaxially or biaxially oriented prior to the heat treatment (described hereafter). Immediately prior to the heat treatment step the acrylic fibrous material or film preferably contains the stabilization promoting agent incorporated therein in a concentration of about 0.1 to 10 percent by weight based upon the weight of the acrylic polymer and most preferably in a concentration of about 0.1 to 5 percent by weight based upon the weight of the acrylic polymer.

The resulting acrylic fibrous material or film containing a minor quantity of the stabilization promoting agent incorporated therein is heated in an oxygen-containing atmosphere at a temperature of about 200° to about 350° C. until a stabilized fibrous product or film is formed which retains its original configuration essentially intact and which is non-burning when subjected to an ordinary match flame. In a preferred embodiment of the process, the oxygen-containing atmosphere is air. Preferred temperatures for the oxygen-containing atmosphere range from about 250° to 350° C., and most preferably about 279° to 290° C. If desired, the fibrous material or film may be exposed to a temperature gradient wherein the temperature is progressively increased.

For best results, uniform contact during the stabilization reaction with molecular oxygen throughout all portions of the acrylic material is encouraged. Such uniform reaction conditions can best be accomplished by limiting the mass of fibrous material or film at any one location so that heat dissipation from within the interior of the same is not unduly impaired, and free access to molecular oxygen is provided. For instance, the acrylic fibrous material or film may be placed in the oxygen-containing atmosphere while wound upon a support to a limited thickness. In a preferred embodiment of the invention, the acrylic fibrous material or film is continuously passed in the direction of its length through the heated oxygen-containing atmosphere. For instance, a continuous length of the acrylic fibrous material or film may be passed through a circulating oven or the tube of a muffle furnace. The speed of passage through the heated oxygen-containing atmosphere will be determined by the size of the heating zone and the desired residence time. A particularly preferred continuous heat treatment is disclosed in commonly assigned U.S. Ser. No. 749,957, filed Aug. 5, 1968 now abandoned, which is herein incorporated by reference.

The period of time required to complete the stabilization reaction within the oxygen-containing atmosphere is generally inversely related to the temperature of the atmosphere, and is also influenced by the denier of the acrylic fibrous material or the thickness of the film undergoing treatment, and the concentration of molecular oxygen in the atmosphere. Treatment times in the oxygen-containing atmosphere accordingly commonly range from about 15 minutes to 20 hours. In preferred embodiments of the process treatment times frequently range from 20 to 25 minutes. Regardless of the stabilization temperature selected within the range of about 200° to 350° C., the presence of the acrylic fibrous material or film having a minor quantity of the stabilization promoting agent incorporated therein results in an accelerated stabilization reaction for a given temperature.

The stabilized acrylic fibrous materials or films formed in accordance with the present process are black in appearance, retain essentially the same configuration as exhibited prior to heat treatment, are non-burning when subjected to an ordinary match flame, commonly have a bound oxygen content of at least 7 (e.g. 7 to 12) percent by weight as determined by the Unterzaucher or other suitable analysis, and commonly contain from about 50 to 65 percent carbon by weight.

The theory whereby the agents herein discussed serve to accelerate the stabilization reaction is considered complex and incapable of simple explanation. It is believed, however, that oxygen cross-linking as well as the cyclization reaction are catalyzed and proceed at an accelerated rate.

Since the oxidative cross-linking reaction is accelerated in the present process, one optionally may elect to carry out the stabilization reaction at a less severe temperature than heretofore commonly utilized. Under milder temperature conditions a more uniform stabilized product may be achieved in the absence of undue chain degradation.

The stabilized fibrous material resulting from the stabilization treatment of the present invention is suitable for use in applications where a fire resistant fibrous material is required. For instance, non-burning fabrics may be formed from the same. As previously indicated, the stabilized acrylic fibrous materials are particularly suited for use as intermediates in the production of carbonized fibrous materials. Such amorphous carbon or graphitic carbon fibrous products may be incorporated in a binder or matrix and serve as a reinforcing medium. The carbon fibers may accordingly serve as a lightweight load bearing component in high performance composite structures which find particular utility in the aerospace industry.

The stabilized film resulting from the stabilization treatment is suitable for use in applications where a fire resistant sheet material is required. Such stabilized films may also be utilized as intermediates in the production of carbonized films. Such carbonized films may be utilized in the formation of lightweight high temperature resistant laminates when incorporated in a matrix material (e.g. an epoxy resin).

The following examples are given as specific illustrations of the invention. It should be understood, however, that the invention is not limited to the specific details set forth in the examples.

EXAMPLE I

A solution of an acrylic polymer is formed while employing N,N-dimethylformamide as a solvent which is maintained at 50° C. Particulate acrylonitrile homopolymer is added to the solvent with stirring in a concentration of 25 percent by weight based upon the weight of N,N-dimethylformamide. A p-toluene sulfonic acid stabilization promoting agent is dissolved in the acrylic polymer solution with stirring in a concentration of 5 percent by weight based upon the weight of the acrylic polymer.

Following filtration, the solution is promptly elevated to 140° C. and is fed to a standard cup type spinneret having a circle of 10 holes each having a diameter of 100 microns. The jet temperature and the temperature of the dry spinning column into which the solution is extruded are maintained at 180° C. The spinning column contains circulating nitrogen which substantially evaporates the N,N-dimethylformamide solvent. The resulting fibers possess a denier per filament of about 8, are subsequently washed to remove residual solvent, and are drawn at a draw ratio of about 5:1 by passage over a hot shoe at a temperature of about 140° C.

The resulting fibers contain p-toluene sulfonic acid incorporated therein in a concentration of about 4 percent by weight, and the pendant nitrile groups of the acrylonitrile units present therein are substantially uncyclized.

The fibrous material is next stabilized on a continuous basis by heating in a circulating air atmosphere provided in a Lindberg muffle furnace having a length of 4 feet. The muffle furnace has an internal diameter of 1 inch and is provided with variable temperature control means whereby a temperature gradient is provided along its length. Axially aligned within the muffle furnace is a section of copper tubing having an internal diameter of 0.5 inch which extends 1.5 inches beyond each end of the muffle furnace. The fibrous material is continuously unwound from a motor driven bobbin while under a tension of 50 grams and is passed through the copper tubing of the muffle furnace while suspended therein at a rate of about 2.4 inches per minute. While passing through the heating zone, the fibrous material is subjected to a temperature gradient wherein the temperature of the air with which it is in contact increases from about 250° C. to about 300° C. at a rate of about 6° C. per minute, and from about 300° to about 310° C. at a rate of about 3° C. per minute where it is maintained for about 7 minutes. The total residence time within the heating zone is about 20 minutes. As the stabilized fibrous material exits from the heating zone, it is passed to a traverse take-up.

The resulting stabilized fibrous material is black in appearance, flexible, has a textile-like hand, retains its original fibrous configuration essentially intact, is non-burning when subjected to an ordinary match flame, retains strength after glowing in a match flame, and has an oxygen content in excess of 11 percent by weight.

In a control run, an identical sample of the acrylonitrile homopolymer fibrous material is passed through the muffle furnace in an identical manner with the exception that it contains no p-toluene sulfonic acid incorporated therein. The resulting fibrous material has a substantially lower oxygen content indicating that the stabilization reaction failed to progress to the degree indicated in Example 1 wherein the p-toluene sulfonic acid serves to promote the same.

The resulting stabilized fibrous material of Example I is carbonized and graphitized in accordance with the teachings of U.S. Ser. No. 777,275, filed Nov. 10, 1968 now abandoned, of Charles M. Clarke, which are herein incorporated by reference. The graphite yarn exhibits satisfactory tensile properties.

EXAMPLE II

Example I is repeated with the exception that the solution of the acrylic polymer is formed under essentially anhydrous conditions and stannic chloride ($SnCl_4$) serves as the stabilization promoting agent. Stannic chloride is dissolved in the acrylonitrile homopolymer solution in a concentration of about 5 percent by weight based upon the weight of the acrylic polymer.

Substantially similar results are achieved.

EXAMPLE III

Example I is repeated with the exception that formic acid serves as the stabilization promoting agent. An 88 percent by weight aqueous formic acid solution is dissolved in the acrylonitrile homopolymer solution in a concentration of about 5 percent by weight based upon the weight of the acrylic polymer.

Substantially similar results are achieved.

EXAMPLE IV

Example I is repeated with the exception that phosphoric acid serves as the stabilization promoting agent. An 85 percent by weight aqueous phosphoric acid solution is dissolved in the acrylonitrile homopolymer solution in a concentration of about 5 percent by weight based upon the weight of the acrylic polymer.

Substantially similar results are achieved.

EXAMPLE V

Example I is repeated with the exception that the extrusion orifice is a horizontal film extrusion slit having a height of 8 mils.

Following biaxial orientation the resulting film containing a minor quantity of p-toluene sulfonic acid incorporated therein is stabilized while suspended in a circulating air oven maintained at 285° C. for 1 hour.

EXAMPLE VI

A solution of an acrylic polymer is formed while employing N,N-dimethylacetamide as solvent which is maintained at 50° C. Particulate acrylonitrile homopolymer is added to the solvent with stirring in a concentration of about 5 percent by weight based upon the weight of the acrylic polymer. Lithium chloride is dissolved in the solution in a concentration of about 2 percent by weight based upon the total weight of the solution.

Following filtration, the solution is fed to a standard cup type spinneret having a circle of ten holes each having a diameter of 100 microns, and is extruded into an essentially non-aqueous coagulation bath having a temperature of about 40° C. consisting of 66 percent by weight ethylene glycol and 34 percent by weight N,N-dimethylacetamide. The as-spun fibrous material is present in the coagulation bath for a residence time of about 6 seconds.

The resulting fibrous material is washed in water maintained at 15° C. for about 1 minute, and is hot drawn at a draw ratio of 2:1 in glycerine stretch bath maintained at 80° C. The drawn fibrous material is washed in water at 15° C. for about 1 minute, and next is passed over a two foot heated draw shoe at a draw ratio of 2:1 which is provided at a constant temperature of 150° C. The residence time while in contact with the hot draw shoe is about 0.5 second.

The fibrous material containing p-toluene sulfonic acid incorporated therein is substantially uncyclized and is next stabilized as described in Example I. Substantially similar results are achieved.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. A process for the production of stabilized acrylic fibers and films which are capable of undergoing carbonization comprising:
   a. providing a solution consisting essentially of (1) an acrylic polymer selected from the group consisting of an acrylonitrile homopolymer and acrylonitrile copolymers containing at least about 85 mol percent of acrylonitrile units and up to about 15 mol percent of one or more monovinyl units copolymerized therewith wherein the pendant nitrile groups present in said acrylic polymer are uncyclized, (2) about 1 to 10 percent by weight based upon the weight of said acrylic polymer of a stabilization promoting agent selected from the group consisting of hydrochloric acid, phosphoric acid, nitric acid, methane sulfonic acid, an aromatic sulfonic acid, and a carboxylic acid having a $pK_A$ value below about 4.5, and (3) a solvent for said acrylic polymer and said stabilization promoting agent selected from the group consisting of N,N-dimethylformamide, N,N-dimethylacetamide, dimethyl sulfoxide, butyrolactone, and N-methyl-2-pyrrolidinone, with said acrylic polymer being present in said solution in a concentration of about 10 to 25 percent by weight based upon the weight of said solvent, and with any heating utilized during the formation of said solution being insufficient to produce cyclization of said pendant nitrile groups of said acrylic polymer,
   b. extruding said solution through a shaped orifice via solution spinning to form an acrylic fibrous material or film wherein the pendant nitrile groups present in said acrylic polymer remain uncyclized and have incorporated therein about 0.1 to 10 percent based upon the weight of said acrylic polymer of said stabilization promoting agent which was initially present in said solution of step (a), and
   c. heating said acrylic fibrous material or film having about 0.1 to 10 percent based upon the weight of said acrylic polymer of said stabilization promoting agent which was initially present in said solution of step (a) incorporated therein in an oxygen-containing atmosphere at a temperature of about 200° to 350° C. until a thermally stabilized fibrous material or film is formed which is black in appearance, non-burning when subjected to an ordinary match flame and which is capable of undergoing carbonization.

2. A process according to claim 1 wherein said acrylic polymer present in said solution is an acrylonitrile homopolymer.

3. A process according to claim 1 wherein said acrylic polymer present in said solution is an acrylonitrile copolymer containing at least about 95 mol percent of acrylonitrile units and up to about 5 mol percent of one or more monovinyl units copolymerized therewith.

4. A process according to claim 1 wherein said stabilization promoting agent is phosphoric acid.

5. A process according to claim 1 wherein said stabilization promoting agent is an aromatic sulfonic acid.

6. A process according to claim 5 wherein said aromatic sulfonic acid is p-toluene sulfonic acid.

7. A process according to claim 1 wherein said stabilization promoting agent is a carboxylic acid having a $pK_A$ value below about 4.5.

8. A process according to claim 7 wherein said carboxylic acid is formic acid.

9. A process according to claim 1 wherein said solution is extruded through a shaped orifice to form a fibrous material.

10. A process according to claim 9 wherein said fibrous material is drawn to a single filament tenacity of at least about 3 grams per denier prior to heating in said oxygen-containing atmosphere.

11. A process according to claim 10 wherein said acrylic fibrous material is a continuous multifilament yarn.

12. A process according to claim 1 wherein said solution is extruded through a shaped orifice to form a film.

13. A process according to claim 1 wherein said acrylic fibrous material or film contains said stabilization promoting agent in a concentration of about 0.1 to 5 percent by weight immediately prior to heating in said oxygen-containing atmosphere.

14. A process according to claim 1 wherein said oxygen-containing atmosphere is air and said fibrous material or film having a minor quantity of said stabilization promoting agent incorporated therein is heated by the continuous passage therethrough in the direction of its length.

15. A process according to claim 1 wherein said oxygen-containing atmosphere is maintained at a temperature of about 270° to 290° C.

16. A process according to claim 1 wherein said solvent is N,N-dimethylformamide.

17. A process according to claim 1 wherein said solvent is N,N-dimethylacetamide.

18. A process according to claim 1 wherein said oxygen-containing atmosphere is air.

* * * * *